United States Patent
Reed (10) Patent No.: US 10,262,081 B2
(45) Date of Patent: Apr. 16, 2019

(54) METHOD AND APPARATUS FOR IMPROVED DATABASE SEARCHING

(71) Applicant: Alvin Roy Reed, Sanford, NC (US)

(72) Inventor: Alvin Roy Reed, Sanford, NC (US)

( * ) Notice: Subject to any disclaimer, the term of this patent is extended or adjusted under 35 U.S.C. 154(b) by 336 days.

(21) Appl. No.: 14/834,510

(22) Filed: Aug. 25, 2015

(65) Prior Publication Data

US 2016/0063055 A1 Mar. 3, 2016

Related U.S. Application Data

(60) Provisional application No. 62/043,443, filed on Aug. 29, 2014.

(51) Int. Cl.
*G06F 17/30* (2006.01)

(52) U.S. Cl.
CPC .............................. *G06F 17/30985* (2013.01)

(58) Field of Classification Search
CPC ......... G06F 17/30395; G06F 17/30457; G06F 17/30504; G06F 17/30985; H04L 9/14; H04L 63/0428; H04L 67/02; H04L 43/16; H04L 63/083; H04L 63/1416; H04L 67/06; H04L 67/10; H04L 67/12; H04L 67/22; H04L 9/0861; H04L 9/30; H04L 9/3231; H04L 12/1859; H04L 1/0076; H04L 2209/80; H04L 29/04; H04L 41/0668; H04L 43/04; H04L 43/045; H04L 43/06; H04L 43/08; H04L 43/12; H04L 51/04; H04L 51/08; H04L 51/10; H04L 51/12; H04L 61/1511; H04L 63/0407; H04L 63/0421; H04L 63/06; H04L 63/0823; H04L 63/107; H04L 63/1425; H04L 63/1433; H04L 63/166; H04L 65/1059; H04L 65/1083; H04L 65/403; H04L 65/4038; H04L 65/604; H04L 67/04; H04L 67/18; H04L 67/26; H04L 67/42; H04L 7/0008; H04L 9/0819; H04L 9/0836; H04L 9/085; H04L 9/0863; H04L 9/0891; H04L 9/32; H04L 9/3242; H04L 9/3247; H04L 9/3249; H04L 9/3263
USPC ........................................................ 707/721
See application file for complete search history.

(56) References Cited

U.S. PATENT DOCUMENTS

| | | | | |
|---|---|---|---|---|
| 5,426,779 A | * | 6/1995 | Chambers, IV | .... G06F 12/0802 |
| 6,278,992 B1 | * | 8/2001 | Curtis | ............... G06F 17/30324 |
| | | | | 707/711 |
| 7,155,442 B2 | * | 12/2006 | Carlin | ..................... G06F 17/22 |
| | | | | 707/693 |
| 2005/0131916 A1 | * | 6/2005 | Banatwala | ........ G06F 17/30595 |
| 2009/0012958 A1 | * | 1/2009 | Raj | .................. G06F 17/30985 |
| 2012/0130983 A1 | * | 5/2012 | Ryan | ................. G06F 17/30985 |
| | | | | 707/715 |

* cited by examiner

*Primary Examiner* — Sheree N Brown
(74) *Attorney, Agent, or Firm* — Smith Anderson, LLP (57) ABSTRACT

A method, apparatus, and computer program product are disclosed for improved string searching. Embodiments described herein provide a mechanism for retrieving string positions of nearest sorted strings. Each letter of the string being used to search for uses its own pointer, each with an array large enough to hold all possible characters. Only the minimum number of letter pointers are needed to make the string unique within the list. Near strings are found by walking up and down each array of pointers to find the closest string.

17 Claims, 5 Drawing Sheets

METHOD AND APPARATUS FOR IMPROVED DATABASE SEARCHING

CROSS-REFERENCE TO RELATED APPLICATIONS

This application claims the benefit of U.S. Provisional Patent Application No. 62/043,443, filed Aug. 29, 2014, the entire contents of which are incorporated herein by reference.

TECHNOLOGICAL FIELD

Example embodiments of the present invention relate generally to search optimization and, more particularly, to a method and apparatus for improved database searching.

BACKGROUND

Sorting and searching are the most common functions done on a computer. One estimate is twenty percent of all computing resources are used to sort and search strings. In this regard, sorting is performed occasionally, but searching is done almost all of the time. Given the ubiquity of search operations, procedures that further optimize search functions are always in great demand. It is estimated that worldwide spending on search functions has entered the trillions of dollars, so improvements to even a small percentage of search operations would represent a very significant for industry. Tree searching, binary searching, and hash searching are common algorithms used today. Tree searching and binary searching quickly narrow down a set of results, but do not necessarily move directly to the correct position in a string. Hash searching is the fastest search procedure of these three, and does go directly to the correct position. However, hash searching does not find nearby sorted elements if an exact match is not found. Therefore, hash searching does not work for insert, like, or between database calls if an exact string match is not found.

BRIEF SUMMARY

A pointer search algorithm improves upon the above-referenced search procedures. Traditionally, pointer search algorithms work by storing each character in a string in its own cell. The cell also includes a pointer to possible next characters in the string. Thus, it is often possible to uniquely identify a particular string using the first few letters of the string. However, in such traditional pointer search algorithms, each pointer always points to an array large enough to hold all possible options for the next character in the string. Most records become unique within the first few characters or words. The first character is looked at and set up with a pointer to store the next character fields. Next, the second character, for each first character, is looked at to set up with a pointer to store the third character fields, and so forth. Accordingly, for long strings, there must be a cell for each character in the string.

To improve upon such methods, example embodiments described herein need not utilize arrays large enough to hold all possible options for the next character. Instead, example embodiments described herein may hold only those By one test for a large number of records, the pointer search algorithm takes considerably less time, on average, to do a search than the fastest binary or tree search procedures.

In a first example embodiment, a method is provided for improved string searching. The method includes receiving a string, and identifying a previous string and a next string based on the received string. For each character in the received string, the method includes identifying a corresponding character in the previous string and a corresponding character in the next string, and performing a string comparison procedure. The string comparison procedure includes determining if a pointer to a node in a first data structure corresponding to the string is identified based on the corresponding character in the previous string or the corresponding character in the next string, in an instance in which a pointer to a node in the first data structure corresponding to the received string is not identified, indicating that the string has been uniquely identified, and in an instance in which a pointer to a node in the first data structure corresponding to the received string is identified, repeating the string comparison procedure.

In some embodiments, the method includes storing a new node in the first data structure corresponding to the received string. In some such embodiments, the method further includes evaluating other strings represented by the first data structure, and determining a number of characters required to uniquely identify the received string when compared to the other strings represented by the first data structure, wherein storing the new node in the first data structure corresponding to the received string comprises storing the new node in the first data structure using the determined number of characters. In other such embodiments, storing the new node in the first data structure corresponding to the received string comprises storing the received string in a memory, and changing pointers from the previous string and the next string to point to a memory location of the received string.

In some embodiments, the method includes, for each node, storing a lowest array position for the node that includes a pointer, and storing a highest array position for the node that includes a pointer. In some embodiments, identifying a previous string and a next string based on the received string uses a stored set of calls. In some embodiments, the method further includes instantiating a recursive operation to identify the previous string and the next string.

In a second example embodiment, an apparatus is provided for improved string searching. The apparatus includes at least one processor and at least one memory including computer program code, the at least one memory and the computer program code configured to, with the at least one processor, cause the apparatus to receive a string, identify a previous string and a next string based on the received string, and for each character in the received string, identify a corresponding character in the previous string and a corresponding character in the next string, and perform a string comparison procedure. The string comparison procedure includes determining if a pointer to a node in a first data structure corresponding to the string is identified based on the corresponding character in the previous string or the corresponding character in the next string, in an instance in which a pointer to a node in the first data structure corresponding to the received string is not identified, indicating that the string has been uniquely identified, and in an instance in which a pointer to a node in the first data structure corresponding to the received string is identified, repeating the string comparison procedure.

In some embodiments, at least one memory and the computer program code are further configured to, with at least one processor, cause the apparatus to store a new node in the first data structure corresponding to the received string. In some such embodiments, at least one memory and the computer program code are further configured to, with at least one processor, cause the apparatus to evaluate other strings represented by the first data structure, and determine a number of characters required to uniquely identify the received string when compared to the other strings represented by the first data structure, wherein storing the new node in the first data structure corresponding to the received string comprises storing the new node in the first data structure using the determined number of characters. In other such embodiments, storing the new node in the first data structure corresponding to the received string comprises storing the received string in a memory, and changing pointers from the previous string and the next string to point to a memory location of the received string.

In some embodiments, at least one memory and the computer program code are further configured to, with at least one processor, cause the apparatus to, for each node, store a lowest array position for the node that includes a pointer, and store a highest array position for the node that includes a pointer. In some embodiments, identifying a previous string and a next string based on the received string uses a stored set of calls. In some embodiments, at least one memory and the computer program code are further configured to, with at least one processor, cause the apparatus to instantiate a recursive operation to identify the previous string and the next string.

In a third example embodiment, a computer program product is provided for improved string searching. The computer program product includes at least one non-transitory computer-readable storage medium having computer-executable program code portions stored therein with the computer-executable program code portions comprising program code instructions that, when executed, cause an apparatus to receive a string, identify a previous string and a next string based on the received string, and for each character in the received string, identify a corresponding character in the previous string and a corresponding character in the next string, and perform a string comparison procedure. The string comparison procedure includes determining if a pointer to a node in a first data structure corresponding to the string is identified based on the corresponding character in the previous string or the corresponding character in the next string, in an instance in which a pointer to a node in the first data structure corresponding to the received string is not identified, indicating that the string has been uniquely identified, and in an instance in which a pointer to a node in the first data structure corresponding to the received string is identified, repeating the string comparison procedure.

In some embodiments, the program code instructions, when executed, further cause the apparatus to store a new node in the first data structure corresponding to the received string. In some such embodiments, the program code instructions, when executed, further cause the apparatus to evaluate other strings represented by the first data structure, and determine a number of characters required to uniquely identify the received string when compared to the other strings represented by the first data structure, wherein storing the new node in the first data structure corresponding to the received string comprises storing the new node in the first data structure using the determined number of characters. In other such embodiments, storing the new node in the first data structure corresponding to the received string comprises storing the received string in a memory, and changing pointers from the previous string and the next string to point to a memory location of the received string.

In some embodiments, the program code instructions, when executed, further cause the apparatus to, for each node, store a lowest array position for the node that includes a pointer, and store a highest array position for the node that includes a pointer. In some embodiments, identifying a previous string and a next string based on the received string uses a stored set of calls. In some embodiments, the program code instructions, when executed, further cause the apparatus to instantiate a recursive operation to identify the previous string and the next string.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus, and computer program product are provided in accordance with an example embodiment of the present invention in order to store and retrieve strings from a list of strings. As such, the method, apparatus, and computer program product may be embodied by any of a variety of devices. For example, the devices may include any of a variety of mobile terminals, such as a portable digital assistant (PDA), mobile telephone, smartphone, mobile television, gaming device, laptop computer, camera, tablet computer, or any combination of the aforementioned devices. Additionally or alternatively, the computing device may comprise one or more fixed computing devices, such as a personal computer or a computer workstation. Still further, the method, apparatus, and computer program product of an example embodiment may be embodied by a networked device, such as a server or other network entity, configured to communicate with one or more devices, such as one or more client devices.

Example embodiments described herein provide a method, apparatus, and computer program product for storing and retrieving strings using a memory. In this regard, the set of strings can be represented using a set of data structures. The first data structure may comprise a hierarchical data structure referred to herein as a tree, although other hierarchical data structures may be used in some embodiments. Each node in the tree corresponds to a character in one or more strings stored by the memory, with the first node in the tree indicating the characters that may comprise the first letter in any string stored by the memory, and each additional node identifying additional characters in one or more strings stored in the memory. In this regard, each node in the tree includes an array having a number of elements corresponding to the number of possible characters that may be included in a string. For example, in an array comprising the first node in the tree, each array position corresponding to the first character in one of the strings stored in the memory will include a pointer to another node in the tree. If there is a subsequent character in any of the strings stored in the memory, then an array position in an array comprising a second node may include a pointer corresponding to that subsequent character that points to yet another node in the tree. However, if a string is uniquely identified based on the sequence of characters identified by traversal to a particular node, then no additional pointers are needed in the array included in that node, and that node will uniquely identify the string. Accordingly, example embodiments only need to utilize the number of characters required to make a given string unique among the set of strings stored in memory.

It should be understood that a second data structure may be used to indicate a correspondence between any node and the string that it uniquely identifies. In addition, third and/or fourth data structures are contemplated to indicate, from any given string, which string is the immediately previous string to the given string and which string is next (in alphabetical order) among the set of strings stored by the memory.

Figure 1:
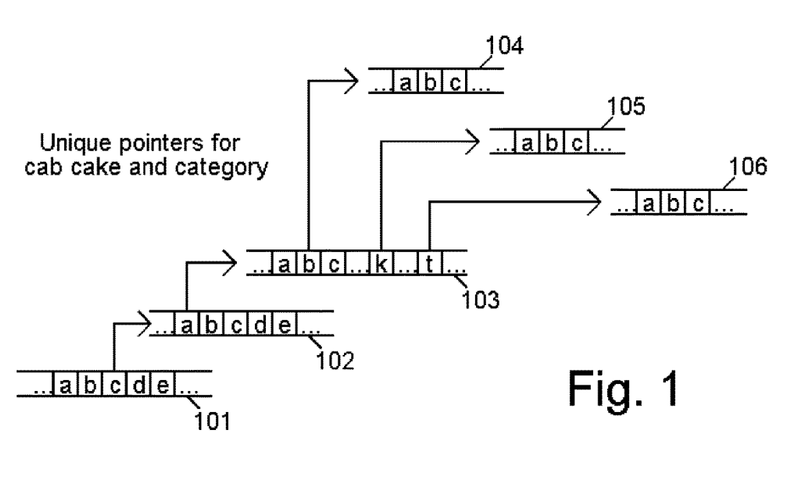
FIG. 1 illustrates an explanatory example of an implementation of a pointer search strategy, in accordance with some example embodiments.

Turning first to FIG. 1, an example is shown illustrating how some example embodiments would store data in a pointer array to uniquely identify three words: 'cab', 'cake', and 'category'. All three words start with the letter 'c'; therefore, as shown in element 101, the third offset in the array included in the first node in the first data structure has a pointer that points to a second node in the data structure (it should be understood that although reference is made that the "third offset" (e.g., the third array position) corresponds to the letter 'c', this reference is for ease of explanation only, and the letter 'c' may not always be located at the third offset, and in an actual implementation, it need only be known which offset the letter 'c' corresponds does correspond to, and that offset will actually contain the pointer). A position indicator is incremented for each new node.

The second node (102) uses offset 'a' for all three words because the second letter 'a' is also the same for all strings. This 'a' position, thus, points to a third node 103. Since the third letter in all three strings is different, there are three separate pointers from the third node to fourth node 104, fifth node 105, and sixth node 106, which are each accordingly at the same position indicator (e.g., same level of the hierarchy). For 'cab', there is a pointer at the 'b' offset to node 104. For 'cake', there is a pointer at the 'k' offset to node 105. Finally, for 'category', there is a pointer at the 't' offset to node 106. Since there are only these three strings in the pointer array and they are all now unique, no further nodes need to be instantiated. Accordingly, the second data structure stores an indication that node 104 represents the word 'cab', that node 105 represents the word 'cake', and that node 106 represents the word 'category'. Furthermore, for the word 'cab', the third and/or fourth data structures indicate that there is no previous string, but that the next string is 'cake'. For the word 'cake', the third and/or fourth data structures indicate that the previous string is 'cab' and that the next string is 'category'. Finally, for the word 'category', the third and/or fourth data structures indicate that the previous string is 'cake', but that there is no next string. However, as additional strings are added to the pointer array, additional nodes can thereafter be added to the first data structure as needed, and corresponding changes may be made to the second, third, and fourth data structures.

Example embodiments described herein utilize pointers to make searching faster. Within each array position, each character has its own set of pointers that account for all subsequent characters that correspond to a string represented by the pointer array. This means that looking for a string match is a matter of following pointers from the first character to the second character, the third, and so forth. The final position found holds the place in another array, at the same position, which points to the position of the corresponding string. The number of characters used at each node can range from a small sub-group to all two hundred and fifty six ASCII characters, although the typical characters allowed are from character number thirty two (a "space") to character one hundred and twenty seven.

If the number of strings that are represented by the pointer array is small, then all characters of each represented string can be used. However, if longer strings will be among the records, then using all characters of all strings is not necessary; rather, only enough of the characters in the represented strings are needed so that the strings can be uniquely distinguished from each other. If this later technique is used, then locations for earlier strings that are similar need to be updated when a string that starts out the same is added.

Within a given node, when an exact match for a string is not yet found, all character positions within the array included in a particular node can be searched, but it is more efficient to keep track of the lowest (e.g., first) and highest (e.g., last) character in the array that contains a pointer, and begin searching through the array starting at the lowest position and stopping at the highest position. This way, needless searching of empty array offsets is avoided, because a much smaller list of character positions needs to be searched for each nearby character.

If the total number of records is always known when the program starts, then each array could be made the same size. If however, this size ranges from small to large, it is more economical to use a dual method for each array. The upper array is not defined at the outset. Each time the full array runs out of room, the next upper array is defined as the required size. This allows the total size of the dual array to vary with the actual size needed.

Figure 2:
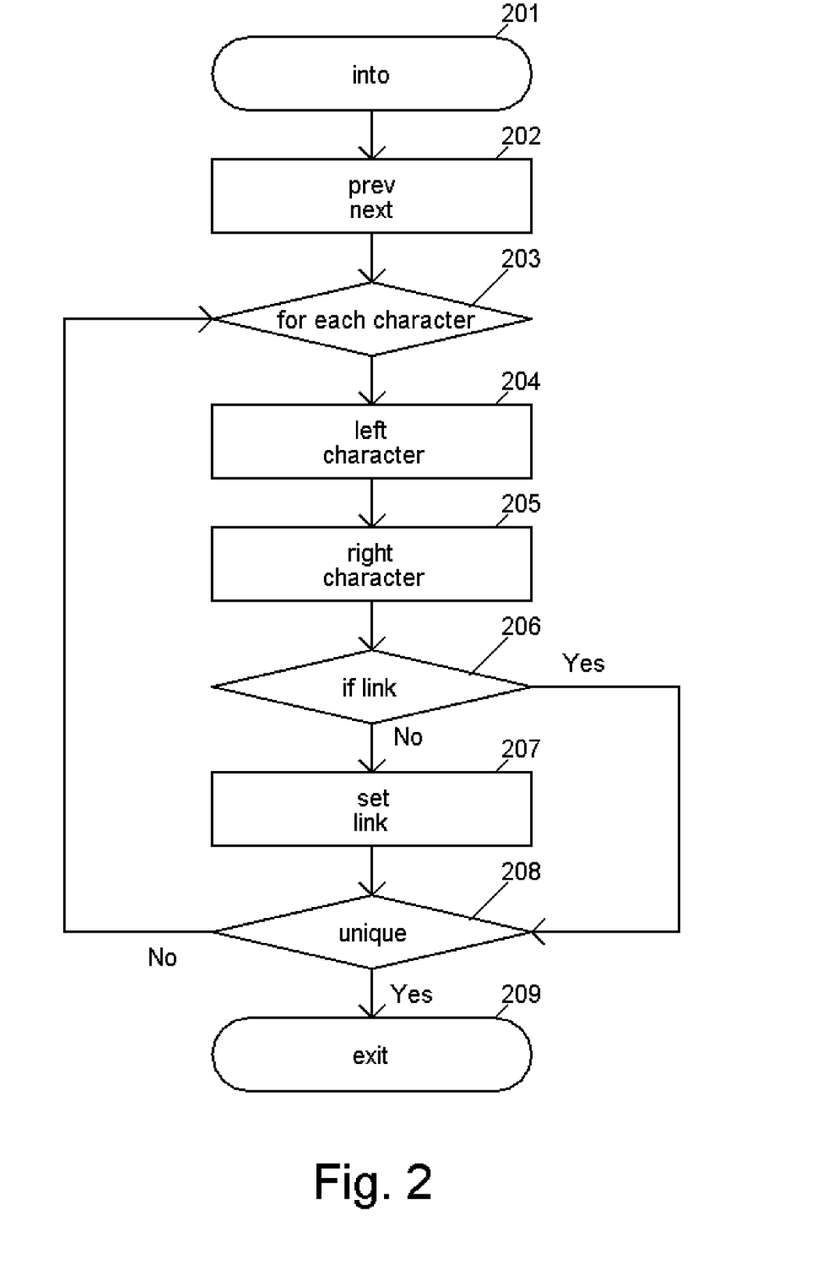
FIG. 2 illustrates a flowchart describing example operations for inserting a new string into a pointer search array, in accordance with some example embodiments.

FIG. 2 illustrates a flowchart containing a series of operations performed to complete an 'into' procedure. One of many possible software implementations of this procedure is the following:

```
501 void into(int ptr, int type)
502 {
503 int nextPos = 0;
504 int prevPos = 0;
505 int pr = prev[nm(ptr)][sz(ptr)];
506 String left = strs[nm(pr)][sz(pr)];
507 int nx = next[nm(ptr)][sz(ptr)];
508 String right = strs[nm(nx)][sz(nx)];
509 String str = strs[nm(ptr)][sz(ptr)];
510 boolean prevOff = false;
511 boolean nextOff = false;
512 hit look = 1;
513 hit lft = 0;
514 int rght = 0;
515 int k = 0;
516 int ch = 0;
517 for (k = 0; k < str.length( ); k++)
518 {
519 ch = s256[str.charAt(k)];
520 lft = -1;
521 if (left.length( ) > k)
522 {
523 lft = s256[left.charAt(k)];
524 }
525 rght = -1;
526 if (right.length( ) > k)
527 {
528 rght = s256[right.charAt(k)];
529 }
530 if (adrArray[nm(look)][sz(look)] == ptr)
531 {
532 adrArray[nm(look)][sz(look)] = 0;
533 }
534 int oldLow = lowArray[nm(look)][sz(look)];
535 if (lnkArray[nm(look)][ch][sz(look)] == 0)
536 {
537 int ln = lowArray[nm(look)][sz(look)];
538 if ((ln == 0) | (ln >= (ch + 1)))
539 {
540 lowArray[nm(look)][sz(look)]
541 = ch + 1;
542 }
543 int lnHg = highArray[nm(look)]
544 [sz(look)];
545 if ((lnHg == 0) | (lnHg <= (ch + 1)))
546 {
547 highArray[nm(look)][sz(look)]
548 = ch + 1;
549 }
550 posArray[nm(look)][sz(look)] = k;
551 arrayPos += 1;
552 lnkArray[nm(look)][ch][sz(look)]
553 = arrayPos;
554 look = arrayPos;
555 if ((look + 1) > (level * SIZE))
556 {
557 more(level++);
558 }
559 if (adrArray[nm(look)][sz(look)] == ptr)
560 {
561 adrArray[nm(look)][sz(look)] = 0;
562 }
563 }
564 else
565 {
566 look = lnkArray[nm(look)][ch][sz(look)];
567 if (adrArray[nm(look)][sz(look)] == ptr)
568 {
569 adrArray[nm(look)][sz(look)] = 0;
570 }
571 }
572 if ((ch != lft))
573 {
574 prevOff = true;
575 }
576 if ((ch != rght))
577 {
578 nextOff = true;
579 }
580 if (prevOff & nextOff)
581 {
582 break;
583 }
584 }
585 if (type != 1)
586 {
587 adrArray[nm(look)][sz(look)] = ptr;
588 lenArray[nm(look)][sz(look)]
589 = strs[nm(ptr)][sz(ptr)].length( );
590 }
591 }
```

The operations illustrated in FIG. 2 may, for example, be performed by an apparatus 500, which is described in greater detail below and which may comprise or control one or more of processor 502A, memory 504A, communications interface 506A, or user interface 508A. The procedure begins at 201 and advances first to operation 202.

In operation 202, the apparatus 500 includes means, such as processor 502A, or the like, for determining the next and previous strings (in alphabetical order) that are stored by the memory (e.g., memory 504A) (shown in the code above at lines 505 through 508). The 'sz' routine is the mod of the position and the 'nm' routine is the position divided by the same number used in 'sz'. This allows a dual array which increases the total array size only as needed. It should be understood that the maintenance of the string, next, previous, and duplicate arrays are not shown because industry standard lists and linked lists may perform these functions. Lines 510 and 511 show the Boolean variables illustrating when both the previous and next strings become unique to the string being added.

In operation 203, the apparatus 500 includes means, such as processor 502A, memory 504A, or the like, for checking each needed character. This operation is shown in the code above at line 517. S256, shown at lines 519, 523, and 528, converts any characters below ASCII 32 to 1, ('blank'), subtracts 31 from ASCII characters thirty three to one hundred twenty seven, and converts any ASCII characters above one hundred and twenty seven to character ninety six.

In operations 204 and 205 (which may occur in either order), the apparatus 500 includes means, such as processor 502A, or the like, for determining the left character and the right character for the current string character position, as shown in lines 520 through 529 above. Lines 530 through 533 reset the address array if this was a previous position that was unique. Lines 537 through 549 maintain the low and high positions for each pointer array to narrow the search for looking for near position.

In operation 206, the apparatus 500 includes means, such as processor 502A, memory 504A or the like, for determining whether a link to another array is found based on the identified left character and right character.

If no link is found, then in operation 207, the apparatus 500 includes means, such as processor 502A or the like, for setting a link, as shown in lines 550 to 553 above (e.g., generating a new node for the string). Subsequently, the procedure advances to operation 208. It should be noted that if a link is found in operation 206, then the procedure advances directly to operation 208, bypassing operation 207.

In operation 208, the apparatus 500 includes means, such as processor 502A, memory 504A, or the like, for determining whether the identified string is unique. If not, then the procedure returns to operation 203 to proceed to the next character. This continues until the string is unique 208. If this has gone past the available set of array positions, then more array positions are created, as shown in line 554 through 558 above. Once the string is identified uniquely, then the procedure ends at 209, in which the apparatus 500 may include means, such as processor 502A, memory 504A, or the like, for storing a new node in the array corresponding to the identified string.

Figure 3:
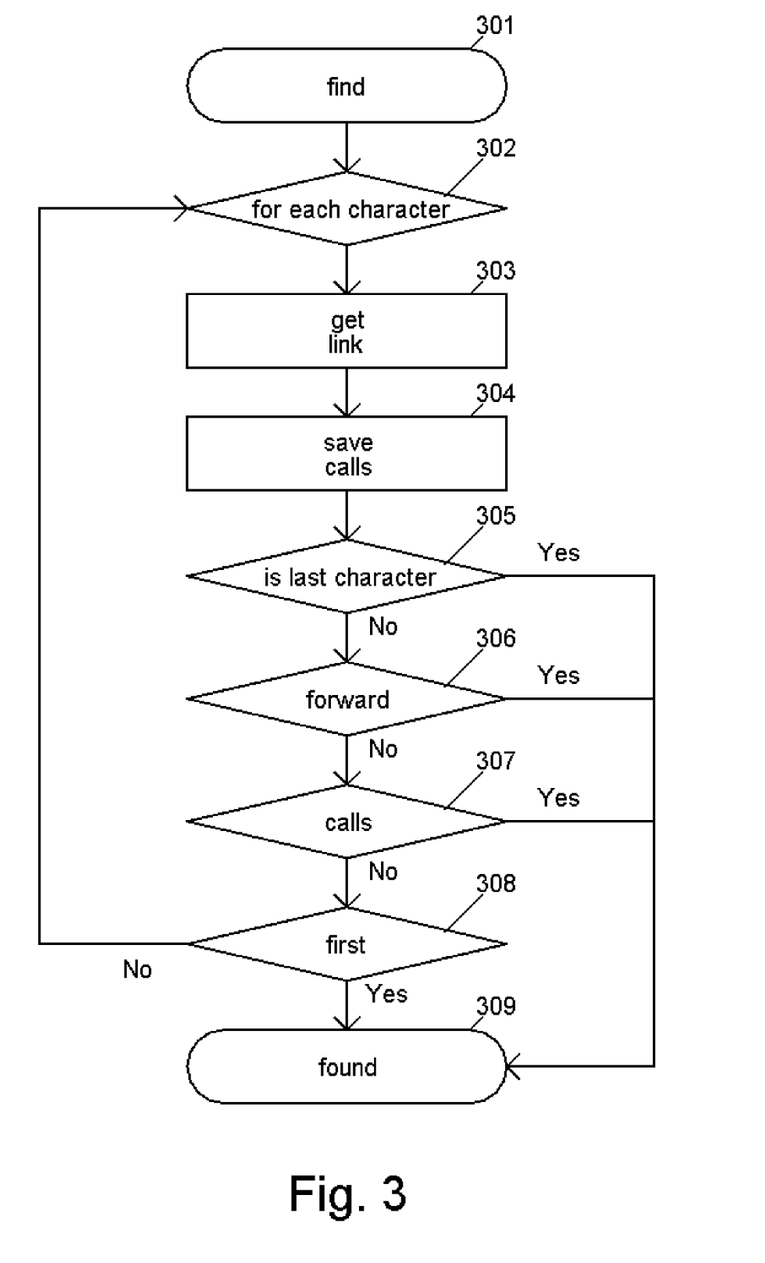
FIG. 3 illustrates a flowchart describing example operations for identifying a matching string and/or storing the search string in a pointer search array, in accordance with some example embodiments.

FIG. 3 illustrates a flowchart containing a series of operations performed to complete a 'find' procedure. One of many possible software implementations of this procedure is the following:

```
601 public int find(String myletters, int type)
602 {
603   int lnk = 1;
604   int len5 = myletters.length( );
605   int m = 0;
606   for (m = 0; m < len5; m++)
607   {
608     int ltr = s256[myletters.charAt(m)];
609     if (lnkArray[nm(lnk)][ltr] == null)
610     {
611       more(level++);
612     }
613     lnk = lnkArray[nm(lnk)][ltr][sz(lnk)];
614     if (type > 0)
615     {
616       calls[0] = m;
617       calls[m + 1] = lnk;
618       callsPos[m + 1] = ltr;
619     }
620     if (lnk == 0)
621     {
622       break;
623     }
624     else if (adrArray[nm(lnk)][sz(lnk)] > 0)
625     {
626       if (len5 == lenArray[nm(lnk)][sz(lnk)])
627       {
628         int kz = adrArray[nm(lnk)][sz(lnk)];
629         if (myletters.equals
630         (strs[nm(kz)][sz(kz)]))
631         {
632           return(kz);
633         }
634       }
635     }
```

```
636   }
637   if (type == 0)
638   {
639     return(-1);
640   }
641   if (lnk > 0)
642   {
643     return(-1 - near(lnk, 0, myletters,
644     type));
645   }
646   for (int ii = calls[0] + 0; ii > 0; ii--)
647   {
648     int ans = near(calls[ii], callsPos[ii + 1]
649     + 1, myletters, type);
650     if (ans > 0)
651     {
652       return(-1 - ans);
653     }
654   }
655   int lastLook = near(startIt,
656   s256[myletters.charAt(0)] + 1,
657   myletters, type);
658   if (lastLook == 0)
659   {
660     lastLook = strsLength;
661   }
662   return(-1 - lastLook);
663 }.
```

The operations illustrated in FIG. 3 may, for example, be performed by an apparatus 500, which is described in greater detail below and which may comprise or control one or more of processor 502A, memory 504A, communications interface 506A, or user interface 508A. In this procedure, 'Lnk' is set to 1, line 603. 'Len5', line 604, is set to the length of the string and is used in line 626 to speed up the search, because an integer comparison is faster than a string comparison. The procedure begins at 301 and advances first to operation 302.

Operation 302 illustrates that the apparatus 500 includes means, such as processor 502A, or the like, for processing each character in turn. In this regard, for each character, the example procedure above may begin at line 606 and proceed from the first character until a link to a matching string is found in line 629.

In operation 303, the apparatus 500 includes means, such as processor 502A for performing a "get link" operation, as shown in line 613 above. 'LnkArray' is the array that holds a pointer for each letter 'ltr'.

As shown in operation 304, the apparatus 500 includes means, such as processor 502A, memory 504A, or the like, for saving the calls to later trace back the pointer location for each character searched, as shown in lines 616 through 618.

In operation 305, the apparatus 500 includes means, such as processor 502A or the like, for determining whether the current character is the last character. If so, or if a match of the 'adrArray' 305 occurs, the procedure advances to operation 309, as shown in lines 624 through 632 above, and then this address is returned as the "found" string.

If the string is not found line 641, the procedure advances from operation 305 to operation 306, and the apparatus 500 includes means, such as processor 502A or the like, for looking forward to determine if there is a string ahead of it. If so, then again the procedure advances to operation 309, while if not, the procedure continues to operation 308.

In operation 307, the apparatus 500 includes means, such as processor 502A or the like, for determining if there is a string with fewer same beginning characters that is the next higher sorted string in the list, as shown in line 646 through 654 above. If so, then the procedure advances to operation 309. If not, then the procedure advances to operation 308.

In operation 308, the apparatus 500 includes means, such as processor 502A or the like, for searching the first character array for the next sorted string in the list, as shown in lines 655 through 662 above.

Finally, in operation 309, the apparatus 500 includes means, such as processor 502A, memory 504A, communications interface 506A, or user interface 508A, for returning the address as the "found" string.

Figure 4:
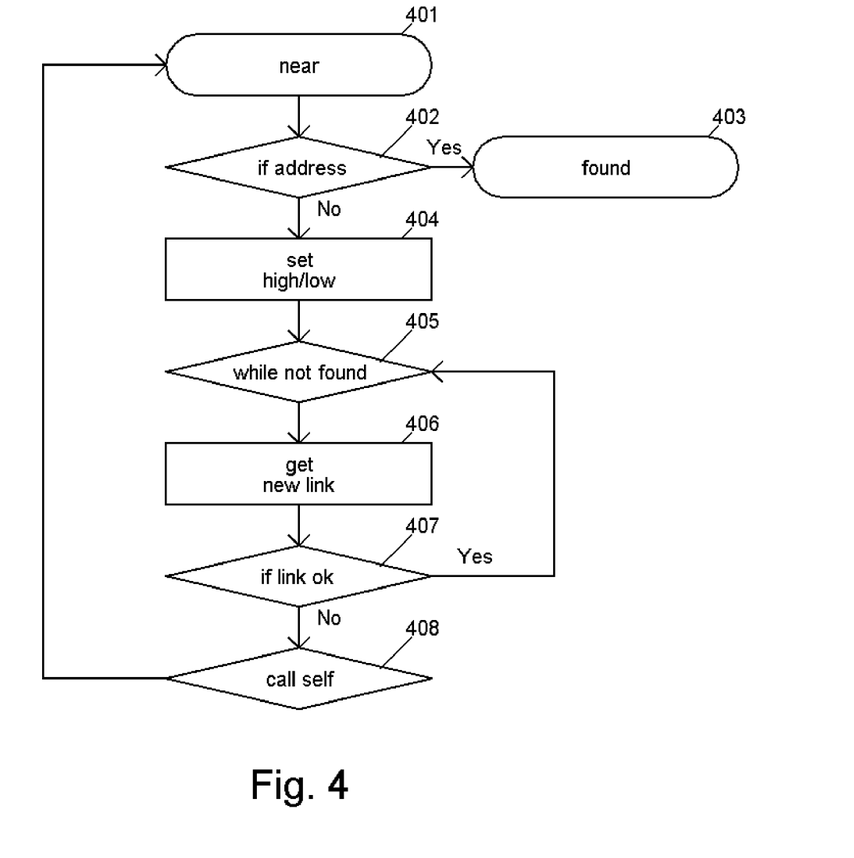
FIG. 4 illustrates a flowchart describing example operations for sequential traversal of a pointer search array, in accordance with some example embodiments.

FIG. 4 illustrates a flowchart containing a series of operations performed to traverse up a pointer array to find the next sorted higher position. One of many possible software implementations of this procedure is the following:

```
701 int near(int lnk, int lkpos, String myletters,
702 int type)
703 {
704 if (lnk > level * SIZE)
705 {
706 more(level++);
707 }
708 int adr = adrArray[nm(lnk)][sz(lnk)];
709 int low = lowArray[nm(lnk)][sz(lnk)];
710 int high = highArray[nm(lnk)][sz(lnk)];
711 int pos = posArray[nm(lnk)][sz(lnk)];
712 if (adr > 0)
713 {
714 int pr = strs[nm(adr)]
715 [sz(adr)].compareTo(myletters);
716 if (pr >= 0)
717 {
718 return(adr);
719 }
720 else
721 {
722 int adr3 = findHigher(adr, myletters, type);
723 if (adr3 > 0) return(adr3);
724 }
725 }
726 int myLow = lkpos;
727 int myHigh = MAXCHAR;
728 if (lkpos == 0)
729 {
730 if (low > 0) myLow = low – 1;
731 }
732 if (high > 0) myHigh = high;
733 boolean cont = true;
734 int nxt = myLow;
735 int loop = 0;
736 while (cont)
737 {
738 if (loop++ > LOOPMAX)
739 {
740 break;
741 }
742 if (nxt < 0) break;
743 int i = nxt;
744 int newLnk = lnkArray[nm(lnk)][i]
745 [sz(lnk)];
746 if (newLnk > 0)
747 {
748 int ans = 0;
749 if (lnk != newLnk)
750 {
751 ans = near(newLnk, 0
752 , myletters, type);
753 }
754 if (ans > 0)
755 {
756 return(ans);
757 }
758 }
759 nxt++;
760 if (nxt >= high) break;
761 }
762 return(0);
763 }
```

The operations illustrated in FIG. 4 may, for example, be performed by an apparatus 500, which is described in greater detail below and which may comprise or control one or more of processor 502A, memory 504A, communications interface 506A, or user interface 508A. The procedure begins at 401 and advances first to operation 402.

In operation 402, the apparatus 500 includes means, such as processor 502A or the like, for comparing a string at a 'link' address to the current string. As shown above, if the 'link' address is not 0, as measured at line 712, then the string at the 'link' address is compared, in lines 714 to 718, to the current string. If the string at the 'link' address is larger, then the procedure advances to operation 403. Otherwise, the procedure advances to operation 404, below.

In operation 403, the apparatus 500 includes means, such as processor 502A or the like, for identifying that the higher match is found, as shown in line 718 above.

In operation 404, the apparatus 500 includes means, such as processor 502A or the like, for determining the high and low, as shown in lines 709 and 710 and 726 through 732 above. This operations is performed to shorten the number of positions looked at.

In operation 405, a loop is performed, as in line 736 above. In this regard, in operation 406, the apparatus 500 includes means, such as processor 502A for looking at all consecutive array positions for a match. The new link is compared to zero, as shown at lines 744 and 746, to see if it is a match. In operation 407, the apparatus 500 includes means, such as processor 502A, for determining if the link is greater than zero, as shown at lines 744 and 746. If the link is ok, the procedure returns to operation 405 to try the next array position. Alternatively, as shown in operation 408, the procedure may be called again if there is a higher string to be found, as shown in lines 751 and 752 above.

In the example software implementations described above, 'LnkArray' is the array used for storing the pointers for each used character of every record. If it is zero in line 535 of the 'into' procedure, then its position is incremented in line 551 and saved in this next incremented position in lines 552 and 553. If it is not zero, it is obtained in line 566. This variable 'look' is used for the other arrays as the current position. Each 'look' variable comes from the previous 'LnkArray' at position look variable. 'AdrArray', 'lowArray', 'HighArray', 'posArray' and 'lenArray' all use this variable as their positions, in these example implementation.

In the find procedure, the position for 'lnkArray' is started at 1 in line 603 as the start position for looking for all strings. If it is null in line 609, then it is determined in line 611 to see if additional space is needed for all of the arrays. Its position is saved in lnk in line 613 and used throughout as the next position to try. 'Lnk' variable is then used in 'adrArray' and 'lenArray' in this particular implementation. In the near procedure, 'lnkArray' is obtained in variable 'newLnk' in line 744 and used throughout as the next position. 'NewLnk' variable is then by the revolving call used in 'adrArray', 'lowArray', 'highArray', and 'posArray' as variable 'lnk' for their position in this particular implementation.

All of the typical database calls are done using the 'into', 'find', and 'near' procedures. The 'find' and 'near' are used with the next and previous pointer to make all of the database calls. An 'insert' procedure, not shown, first adds the string to the list of strings. A 'find' procedure, not shown, sees if it is a duplicate and if so, adds it to the duplicated linked list. If it is not found, then the previous pointer points to this new string location. This new location points to next. The previous next is then pointed to this string and this strings previous pointer points to the previous position. A 'load' procedure, not shown, uses this insert procedure to load all the initial records. A 'delete' procedure, not shown, reconnects the previous pointer to next, and the next pointer to previous. An 'update' procedure, not shown, deletes the current position, then inserts the same array position at the new string sorted location. A 'duplicate' procedure, not shown, retrieves all duplicate positions. A 'like' procedure, not shown, finds the sorted position, then moves upward until the string starting characters for the like are passed, then finds all duplicates. A 'between' procedure, not shown, operations similarly to the 'like' procedure, but looks for the second 'between' string to be passed.

Figure 5:
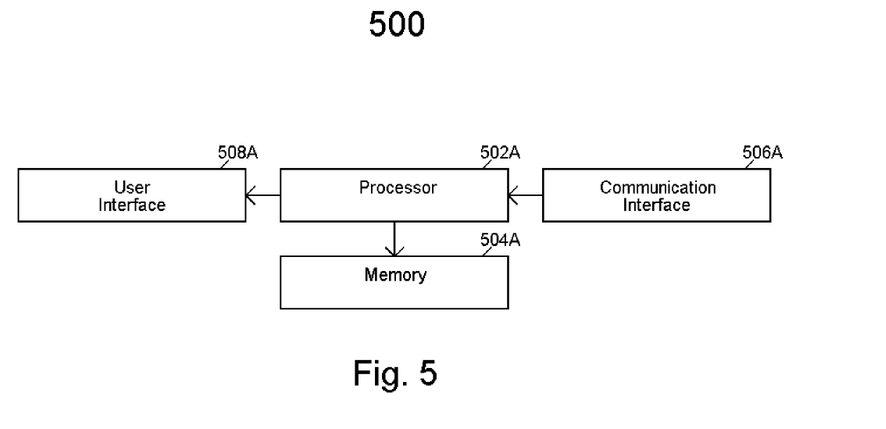
FIG. 5 shows a block diagram of an apparatus that may be specifically configured in accordance with an example embodiment of the present invention.

Regardless of the type of device, an apparatus 500 that may be specifically configured in accordance with an example embodiment of the present invention is illustrated in FIG. 5. It should be noted that while FIG. 5 illustrates one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 5, the apparatus 500 may include or otherwise be in communication with a processor 502A, a memory device 504A, and optionally a communication interface 506A, and a user interface 508A. In some embodiments, the processor 502A (and/or co-processor or any other processing circuitry assisting or otherwise associated with the processor) may be in communication with the memory device via a bus for passing information among components of the apparatus. The memory device 504A may be non-transitory and may include, for example, one or more volatile and/or non-volatile memories. In other words, for example, the memory device 504A may be an electronic storage device (e.g., a computer readable storage medium) comprising gates configured to store data (e.g., bits) that may be retrievable by a machine (e.g., a computing device like the processor). The memory device 504A may be configured to store information, data, content, applications, instructions, or the like, for enabling the apparatus to carry out various functions in accordance with an example embodiment of the present invention. For example, the memory device 504A could be configured to buffer input data for processing by the processor 502A. Additionally or alternatively, the memory device 504A could be configured to store instructions for execution by the processor 502A.

The apparatus 500 may be embodied by a computing device, such as a computer terminal. However, in some embodiments, the apparatus 500 may be embodied as a chip or chip set. In other words, the apparatus 500 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The apparatus 500 may therefore, in some cases, be configured to implement an embodiment of the present invention on a single chip or as a single "system on a chip." As such, in some cases, a chip or chipset may constitute means for performing one or more operations for providing the functionalities described herein.

The processor 502A may be embodied in a number of different ways. For example, the processor 502A may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 502A may include one or more processing cores configured to perform independently. A multi-core processor may enable multiprocessing within a single physical package. Additionally or alternatively, the processor 502A may include one or more processors configured in tandem via the bus to enable independent execution of instructions, pipelining, and/or multithreading.

In an example embodiment, the processor 502A may be configured to execute instructions stored in the memory device 504A or otherwise accessible to the processor 502A. Alternatively or additionally, the processor 502A may be configured to execute hard-coded functionality. As such, whether configured by hardware or software methods, or by a combination thereof, the processor 502A may represent an entity (e.g., physically embodied in circuitry) capable of performing operations according to an embodiment of the present invention while configured accordingly. Thus, for example, when the processor 502A is embodied as an ASIC, FPGA, or the like, the processor 502A may be specifically configured hardware for conducting the operations described herein. Alternatively, as another example, when the processor 502A is embodied as an executor of software instructions, the instructions may specifically configure the processor 502A to perform the algorithms and/or operations described herein when the instructions are executed. However, in some cases, the processor 502A may be a processor of a specific device (e.g., a pass-through display or a mobile terminal) configured to employ an embodiment of the present invention by further configuration of the processor 502 by instructions for performing the algorithms and/or operations described herein. The processor 502A may include, among other things, a clock, an arithmetic logic unit (ALU), and logic gates configured to support operation of the processor 502A.

Meanwhile, the communication interface 506A may be any means such as a device or circuitry embodied in either hardware or a combination of hardware and software that is configured to receive and/or transmit data from/to a network and/or any other device or module in communication with the apparatus 500. In this regard, the communication interface 506A may include, for example, an antenna (or multiple antennas) and supporting hardware and/or software for enabling communications with a wireless communication network. Additionally or alternatively, the communication interface 506A may include the circuitry for interacting with the antenna(s) to cause transmission of signals via the antenna(s) or to handle receipt of signals received via the antenna(s). In some environments, the communication interface 506A may additionally or alternatively support wired communication. As such, for example, the communication interface 506A may include a communication modem and/or other hardware/software for supporting communication via cable, digital subscriber line (DSL), universal serial bus (USB), or other mechanisms.

In some embodiments, the apparatus 500 may include a user interface 508A that may, in turn, be in communication with processor 502A to provide output to the user and, in some embodiments, to receive an indication of a user input. As such, the user interface 508A may include a display and, in some embodiments, may also include a keyboard, a mouse, a joystick, a touch screen, touch areas, soft keys, a microphone, a speaker, or other input/output mechanisms. Alternatively or additionally, the processor 502A may comprise user interface circuitry configured to control at least some functions of one or more user interface elements such as a display and, in some embodiments, a speaker, ringer, microphone, and/or the like. The processor 502A and/or user interface circuitry comprising the processor 502A may be configured to control one or more functions of one or more user interface elements through computer program instructions (e.g., software and/or firmware) stored on a memory accessible to the processor 502A (e.g., memory device 504A, and/or the like).

As described above, FIGS. 2-4 illustrate flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 504A of an apparatus employing an embodiment of the present invention and executed by a processor 502A of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method performed by a controller for storing a character string in a first data structure, the method comprising:

receiving, from a communication interface circuit operationally coupled to the controller, the character string;

identifying, in a second data structure that indicates for each of a plurality of alphabetically ordered character strings stored in the first data structure a previous character string or a next character string of that alphabetically ordered character string, which of the plurality of alphabetically ordered character strings is the previous and next character strings based on the received string, wherein the first data structure has a plurality of hierarchical character storage elements representing a plurality of alphabetically ordered character strings, each hierarchical character storage element corresponding to a certain character position that indicates a character of the alphabetically ordered character strings at that position that has a same character at each previous character position; and in response to determining that a character of the received string at a successive character position is different from a character at that position in each of the previous and next strings:

generating a new hierarchical character storage element of the first data structure that corresponds to the successive character position that indicates the character of the received string at that position;

storing, in the new hierarchical character storage element of the first data structure, an indication of the character of the received string at that position;

evaluating at least one of the plurality of alphabetically ordered character strings and the received string to determine a number of sequential characters, starting at a beginning of the received string, that uniquely identify the received string from those alphabetically ordered character strings;

storing an indication of the number of sequential characters that uniquely identify the received string;

changing, in the second data structure, an indication of a next character string of the previous string to indicate the received string and an indication of a previous character string of the next string to indicate the received string; and maintaining, for the plurality of alphabetically ordered character storage elements having the subsequent character position, an indication of which storage element at the subsequent character position is an alphabetically first or last character.

2. The method of claim 1, further comprising:
initializing, in the second data structure, an indication of a previous character string of the received string to indicate the previous string and an indication of a next character string of the received string to indicate the next string responsive to determining that the character of the received string at the successive character position is different from the characters at that position in both the previous and next strings.

3. The method of claim 1, further comprising:
determining that the new element represents a last character of the received string.

4. The method of claim 3, further comprising:
storing, in a third data structure that indicates for each alphabetically ordered character string which element represents a last character of that alphabetically ordered character string, an indication that the new element represents the last character of the received string.

5. The method of claim 3, wherein the new element that represents the last character of the received string indicates the received string.

6. The method of claim 1, wherein each element represents a node of a tree structure.

7. The method of claim 1, further comprising:
determining which element corresponds to a next character position of the received string.

8. The method of claim 7, further comprising:
storing, in the new element, an indication of the element that corresponds to the next character position of the received string.

9. The method of claim 1, further comprising:
determining an alphabetically ordered position of the received string in the alphabetically ordered character strings.

10. The method of claim 9, further comprising:
storing, in a fourth data structure that represents the alphabetically ordered character strings, the received string at that position.

11. The method of claim 1, wherein said storing the indication of the number of sequential characters that uniquely identify the received string includes:
storing, in the second data structure, the number of characters from the beginning of the received string that uniquely identify the received string.

12. The method of claim 1, wherein each element corresponds to a certain character at a certain character position that represents those alphabetically ordered character strings that have a same character at that position and for each previous character position.

13. The method of claim 1, wherein said maintaining includes:
storing an indication of which storage element of the subsequent character position is the alphabetically first or last character.

14. An apparatus configured for storing a character string in a first data structure, the apparatus comprising at least one controller and at least one memory including computer program code, the at least one memory and the computer program code configured to, with the at least one controller, cause the apparatus to:
receive, from a communication interface circuit operationally coupled to the controller, the character string;
identify, in a second data structure that indicates, for each of a plurality of alphabetically ordered character strings stored in the first data structure, a previous character string or a next character string of that alphabetically ordered character string, which of the plurality of alphabetically ordered character strings is the previous and next character strings based on the received string, wherein the first data structure has a plurality of hierarchical character storage elements representing a plurality of alphabetically ordered character strings, each hierarchical character storage element corresponding to a certain character position that indicates a character of the alphabetically ordered character strings at that position that has a same character at each previous character position; and
in response to determining that a character of the received string at a successive character position is different from a character at that position in each of the previous and next strings:
generate a new hierarchical character storage element of the first data structure that corresponds to the successive character position that indicates the character of the received string at that position;
store, in the new hierarchical character storage element of the first data structure, an indication of the character of the received string at that position;
evaluate at least one of the plurality of alphabetically ordered character strings and the received string to determine a number of sequential characters, starting at a beginning of the received string, that uniquely identify the received string from those alphabetically ordered character strings;
store an indication of the number of sequential characters that uniquely identify the received string;
change an indication of a next character string of the previous string to indicate the received string and an indication of a previous character string of the next string to indicate the received string; and
maintain, for the plurality of alphabetically ordered character storage elements having the subsequent character position, an indication of which storage element at the subsequent character position is an alphabetically first or last character.

15. The method of claim 14, wherein the at least one memory and the computer program code are further configured to cause the apparatus to:
initialize, in the second data structure, an indication of a previous character string of the received string to indicate the previous string and an indication of a next character string of the received string to indicate the next string responsive to determining that the character of the received string at the successive character position is different from the characters at that position in both the previous and next strings.

16. A computer-implemented computer program product for storing a character string in a first data structure, the computer program product comprising at least one non-transitory computer-readable storage medium having computer-executable program code portions stored therein, the computer-executable program code portions comprising program code instructions that, when executed, cause a controller to:
receive, from a communication interface circuit operationally coupled to the controller, the character string;
identify, in a second data structure that indicates, for each of a plurality of alphabetically ordered character strings stored in the first data structure, a previous character string or a next character string of that alphabetically ordered character string, which of the plurality of alphabetically ordered character strings is the previous and next character strings based on the received string, wherein the first data structure has a plurality of hierarchical character storage elements representing a plurality of alphabetically ordered character strings, each hierarchical character storage element corresponding to a certain character position that indicates a character of the alphabetically ordered character strings at that position that has a same character at each previous character position; and in response to determining that a character of the received string at a successive character position is different from a character at that position in each of the previous and next strings:

generate a new hierarchical character storage element of the first data structure that corresponds to the successive character position that indicates the character of the received string at that position;

store, in the new hierarchical character storage element of the first data structure, an indication of the character of the received string at that position;

evaluate at least one of the plurality of alphabetically ordered character strings and the received string to determine a number of sequential characters, starting at a beginning of the received string, that uniquely identify the received string from those alphabetically ordered character strings;

store an indication of the number of sequential characters that uniquely identify the received string;

change an indication of a next character string of the previous string to indicate the received string and an indication of a previous character string of the next string to indicate the received string; and maintain, for the plurality of alphabetically ordered character storage elements having the subsequent character position, an indication of which storage element at the subsequent character position is an alphabetically first or last character.

17. The method of claim 16, wherein the computer-executable program code portions further comprise program code instructions that cause the controller to:

initialize, in the second data structure, an indication of a previous character string of the received string to indicate the previous string and an indication of a next character string of the received string to indicate the next string responsive to determining that the character of the received string at the successive character position is different from the characters at that position in both the previous and next strings.

* * * * *